United States Patent
Meyer

(10) Patent No.: US 8,179,996 B2
(45) Date of Patent: May 15, 2012

(54) METHOD AND DEVICE FOR DECODING A SIGNAL

(75) Inventor: Jacques Meyer, Saint-Martin-le-Vinoux (FR)

(73) Assignee: STMicroelectronics S.A., Montrouge (FR)

( * ) Notice: Subject to any disclaimer, the term of this patent is extended or adjusted under 35 U.S.C. 154(b) by 669 days.

(21) Appl. No.: 11/962,805

(22) Filed: Dec. 21, 2007

(65) Prior Publication Data

US 2008/0152041 A1    Jun. 26, 2008

(30) Foreign Application Priority Data

Dec. 26, 2006  (FR) ...................... 06 55951

(51) Int. Cl.
*H04L 27/00* (2006.01)
(52) U.S. Cl. ...................................... 375/324
(58) Field of Classification Search .......... 375/260, 375/150, 279, 272, 324; 370/503
See application file for complete search history.

(56) References Cited

U.S. PATENT DOCUMENTS

| | | | |
|---|---|---|---|
| 6,185,199 B1 * | 2/2001 | Zehavi | 370/335 |
| 2004/0252725 A1 | 12/2004 | Sun et al. | |
| 2006/0067432 A1 | 3/2006 | Thesling et al. | |
| 2006/0078077 A1 * | 4/2006 | Karr | 375/367 |
| 2009/0296799 A1 * | 12/2009 | Casas et al. | 375/231 |

OTHER PUBLICATIONS

French Search Report from French Patent Application 06/55951, filed Dec. 26, 2006.
"Digital Video Broadcasting (DVB) User guidelines for the second generation system for Broadcasting, Interactive Services, News Gatherin and other broadband satellite applications (DVB-S2)" ETSI Standards, European Telecommunications Standards Institute, Sophia-Antipo, FR, vol. BC, No. V111, Feb. 2005, XP014027139 ISSN: 0000-0001.

* cited by examiner

*Primary Examiner* — Khai Tran
(74) *Attorney, Agent, or Firm* — Wolf, Greenfield & Sacks, P.C.

(57) ABSTRACT

A method and a circuit for determining the frame header of a signal that can be applied to standard DVBS2.

33 Claims, 4 Drawing Sheets $(B0, B1, ..., Bi, ..., B63) = (b0, b6, b5, b4, b3, b2, b1) \times (M)$ $$M = \begin{pmatrix} 0101010101010101010101010101010101010101010101010101010101010101 \\ 0011001100110011001100110011001100110011001100110011001100110011 \\ 0000111100001111000011110000111100001111000011110000111100001111 \\ 0000000011111111000000001111111100000000111111110000000011111111 \\ 0000000000000000111111111111111100000000000000001111111111111111 \\ 0000000000000000000000000000000011111111111111111111111111111111 \\ 1111111111111111111111111111111111111111111111111111111111111111 \end{pmatrix}$$

METHOD AND DEVICE FOR DECODING A SIGNAL

BACKGROUND OF THE INVENTION

1. Field of the Invention

The present invention relates to the transmission of data, in particular when the data are gathered in frames or blocks comprising headers.

2. Discussion of the Related Art

FIG. 1 shows the structure of a frame header 1 in a data transmission such as currently provided by standard DVBS2 (Digital Video Broadcasting Satellite).

Header 1 comprises 90 symbols and is formed of a portion 2 noted "SOF" ("Start Of Frame") and a portion 3 noted "PLS" ("Physical Layer Structure").

Portion SOF comprises 26 symbols corresponding to a known 26-bit sequence. To obtain these 26 symbols, the 26 bits of the known sequence are coded according to a modulation of $\pi/2$.BPSK type. According to this modulation, a symbol $e^{j\varphi}$ or $-e^{j\varphi}$ is assigned to each bit 0 or 1 and, further, the even and odd symbols exhibit a $\pi/2$ phase shift with respect to one another.

Portion PLS comprises 64 symbols, and defines the structure of the frame elements, like the type of data coding, the used modulation, the frame length, the presence of pilots, the pilots corresponding to a set of symbols known by the demodulator and easing the estimating of the reception parameters, etc. The 64 symbols of portion PLS originate from a 7-bit code word b0-b6 corresponding to $2^7$, that is, 128 coding possibilities for the frame. Some bits of the code word play a particular role. Thus, bit b1 indicates whether the frame is long or short and bit b0 indicates the presence or the absence of pilots.

FIGS. 2A and 2B illustrate a way of obtaining the 64 symbols from the 7 bits of the code word. In FIG. 2A, 64 bits B0, B1, . . . Bi, . . . B63 are obtained by multiplying a line vector (b0, b6, b5, b4, b3, b2, b1) formed of the bits of the code word by a matrix M comprising 7 lines and 64 columns. Matrix M is shown in FIG. 2B. The 64 bits Bi resulting from the multiplication are then combined (by XOR) with a known word UW ("Unique Word") to improve the spectrum distribution of the signal power and transformed into symbols by a modulation of $\pi/2$.BPSK type. The 64 obtained symbols are unknown by the receiver, but it is known on reception that they belong to a determined set of 128 possibilities.

A difficulty to decode the signal is to determine the frame headers.

For example, on a first acquisition (powering-on, television channel switching, information drop-out, as when passing under a tunnel in mobile reception), the header position is unknown and the header may start at any symbol. Account must also be taken in this case of the carrier frequency shift. This shift, due to the various frequency switchings undergone by the signal, is then unknown and its effect is to assign to each symbol a phase error proportional to time. The carrier frequency shift may be very large, to for example reach 20% of the symbol frequency.

In steady state, where the decoding of the code word of the previous header provides the frame length and accordingly the position of the next header, the code word may vary from one frame to the other and specific care must be given to the header determination.

SUMMARY OF THE INVENTION

An object of an embodiment of the present invention is to provide a method and/or a device for overcoming the disadvantages of prior art and/or providing an equivalent to the methods and/or devices of prior art.

An object of an embodiment of the present invention thus is to provide a method and/or a device for efficiently decoding a signal.

Another object of an embodiment of the present invention is to provide a method and/or a device for efficiently determining a frame header.

Another object of an embodiment of the present invention is to provide a method and/or a device such as described or suggested in any part of the present application.

To achieve all or part of these objects, as well as others, which will appear by the light of the present application, an embodiment of the present invention provides a method for determining a frame header formed of samples having been coded so that a sample exhibits either value $A.e^{j\theta}$ or value $A.e^{j(\theta+\pi)}$ and comprising at least N1 first samples corresponding to a first determined sequence and N2 second samples corresponding to a second sequence belonging to a set of N second determined sequences, the N2 second samples being either equal two by two, or opposite two by two, comprising:

a) a correlation step involving N1 samples, in which a correlation is performed between the product of a sample and of the conjugate of an adjacent sample and the corresponding values of the first sequence to generate a first result;

b) a correlation step involving N2 samples, in which is performed the sum of the products of a sample of a pair of two successive samples by the conjugate of the other sample in the pair to generate a second result;

c) a step of detection of a frame header based on the first and second results; and d) a step of validation of the detected frame header.

According to an embodiment of the present invention, the validation step comprises the step of:

e) correcting the first and second samples of the detected header for a determined frequency shift;

f) determining a correlation maximum bearing on the first and second corrected samples, during which step are performed, on the one hand, the correlation between each first corrected sample and the corresponding value of the first sequence and, on the other hand, the correlation between each second sample and the value that it would have in each of the second N determined sequences;

g) resuming, for a determined number of frequency shift values, the steps of correction e) and of correlation f) with another frequency shift value; and h) validating the frame header based on the maximum correlation values determined at step f).

According to an embodiment of the present invention, a frame header is detected if the sum of the real parts of the correlations performed at steps a) and b) is greater than a first threshold.

According to an embodiment of the present invention, the detected frame header is validated if the greater one of the modules of the maximum correlation values determined at step f) is greater than a second threshold.

According to an embodiment of the present invention, the first and second samples originate from bits having undergone a modulation of $\pi/2$.BPSK type.

An embodiment of the present invention also provides a circuit for determining a frame header formed of samples having been coded so that a sample exhibits either value $A.e^{j\theta}$ or value $A.e^{j(\theta+\pi)}$ and comprising at least N1 first samples corresponding to a first determined sequence and N2 second samples corresponding to a second sequence belonging to a set of N second determined sequences, the N2 second samples being either equal two by two, or opposite two by two, comprising:

a) a detection circuit for detecting a frame header, the circuit comprising:

a1) a first circuit dealing with N1 samples, for performing a correlation between the product of a sample and of the conjugate of an adjacent sample and the corresponding values of the first sequence;

a2) a second circuit dealing with N2 samples, for performing the sum of the products of a sample of a pair of two successive samples by the conjugate of the other sample in the pair;

a3) a first adder for adding the results originating from the first and second circuits; and a4) a detection unit for detecting a frame header when the real part of the result provided by the first adder is greater than a first threshold; and b) a validation and decoding circuit for validating and decoding the header detected by the detection circuit, the validation and decoding circuit comprising:

b1) a third circuit dealing with the N1 first samples of the detected header, for performing a correlation between each first sample and the corresponding value of the first sequence;

b2) a fourth circuit dealing with the N2 second samples of the detected header, for performing a correlation between each second sample and the value that it would have in a second specific sequence; and b3) a fifth circuit for determining the greatest of the modules of the sums of the correlations performed by the third and fourth circuits, N correlations being performed by the fourth circuit and a header being validated if the greatest of the modules is greater than a second threshold.

According to an embodiment of the present invention, the validation and decoding circuit further comprises a sixth circuit for providing the third and fourth circuits with corrected samples for a specific carrier frequency shift.

According to an embodiment of the present invention, the first circuit comprises N1-2 first delay elements, N1-1 first gain units coupled with the first delay elements, and a second adder coupled with the first gain units, and the second circuit comprises N2 second delay elements, N2/2 second gain units coupled with the second delay elements, and a third adder coupled to the second gain units.

According to an embodiment of the present invention, parameter N1 is equal to 26, parameter N2 is equal to 64, parameter N is equal to 128, the fourth circuit uses a fast Hadamard transform and sequentially provides twice 32 correlations performed by means of N2/2 second samples, the fifth circuit comprises a fourth adder to calculate the difference between the correlation performed by the third circuit and the correlation performed by the fourth circuit, a fifth adder to calculate the difference between the correlation performed by the third circuit and the correlation performed by the fourth circuit, and unit for determining the module of the results delivered by the fourth and fifth adders and selecting the greatest one.

According to an embodiment of the present invention, the circuit further comprises a seventh circuit capable of evaluating the average of the phases of the first and second samples of a valid header as well as the average of the phases of n1 samples of a valid header and the average of the phases of n2 samples of a valid header, to deduce therefrom the average phase of the samples and the variation of the average phase of the samples.

According to an embodiment of the present invention, the first and second samples originate from bits having undergone a modulation of $\pi/2$.BPSK type.

An embodiment of the present invention also provides a decoder or a demodulator comprising a circuit such as described hereabove or implementing a method such as described hereabove.

An embodiment of the present invention also provides a receiver or a computer or a cellular phone comprising a circuit such as described hereabove or implementing a method such as described hereabove.

The foregoing and other objects, features, and advantages of the present invention will be discussed in detail in the following non-limiting description of specific embodiments in connection with the accompanying drawings.

BRIEF DESCRIPTION OF THE DRAWINGS

FIG. 2 shows a conventional matrix used in the coding of the header of FIG. 1;

DETAILED DESCRIPTION

Figures 1, 2A, 2B:
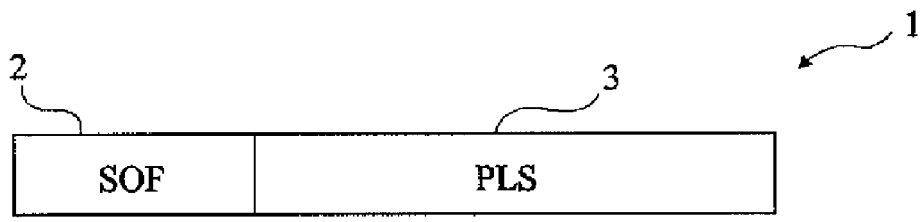
FIG. 1 shows the structure of a conventional frame header.

For clarity, the same elements have been designated with the same reference numerals in the different drawings and, further, as usual in the representation of integrated circuits, the various drawings are not to scale.

An embodiment of the present invention applies in particular to the determination of the headers of frames transmitted according to standard DVBS2. Embodiments of the present invention provide detecting headers, in any transmission where the signal is or has been coded in blocks or frames comprising a header having at least N1+N2 samples coded so that a sample exhibits either value $A.e^{j\theta}$ or value $A.e^{j(\theta+\pi)}$, among which the N1 samples correspond to a known sequence and the N2 samples correspond to a sequence belonging to a set of N possible known sequences, the N2 samples being all equal or opposite two by two. The header may comprise more than N1+N2 samples, and the N1+N2 samples of the header are not necessarily consecutive; in particular, the header may start elsewhere than at the beginning of a frame or be repeated during a frame, etc. Also, it is not necessary for the samples to have undergone a modulation of $\pi/2$.BPSK type, it is enough for the samples to be representable at any stage either by value $A.e^{j\theta}$ or by value $A.e^{j(\theta+\pi)}$.

Figure 3:
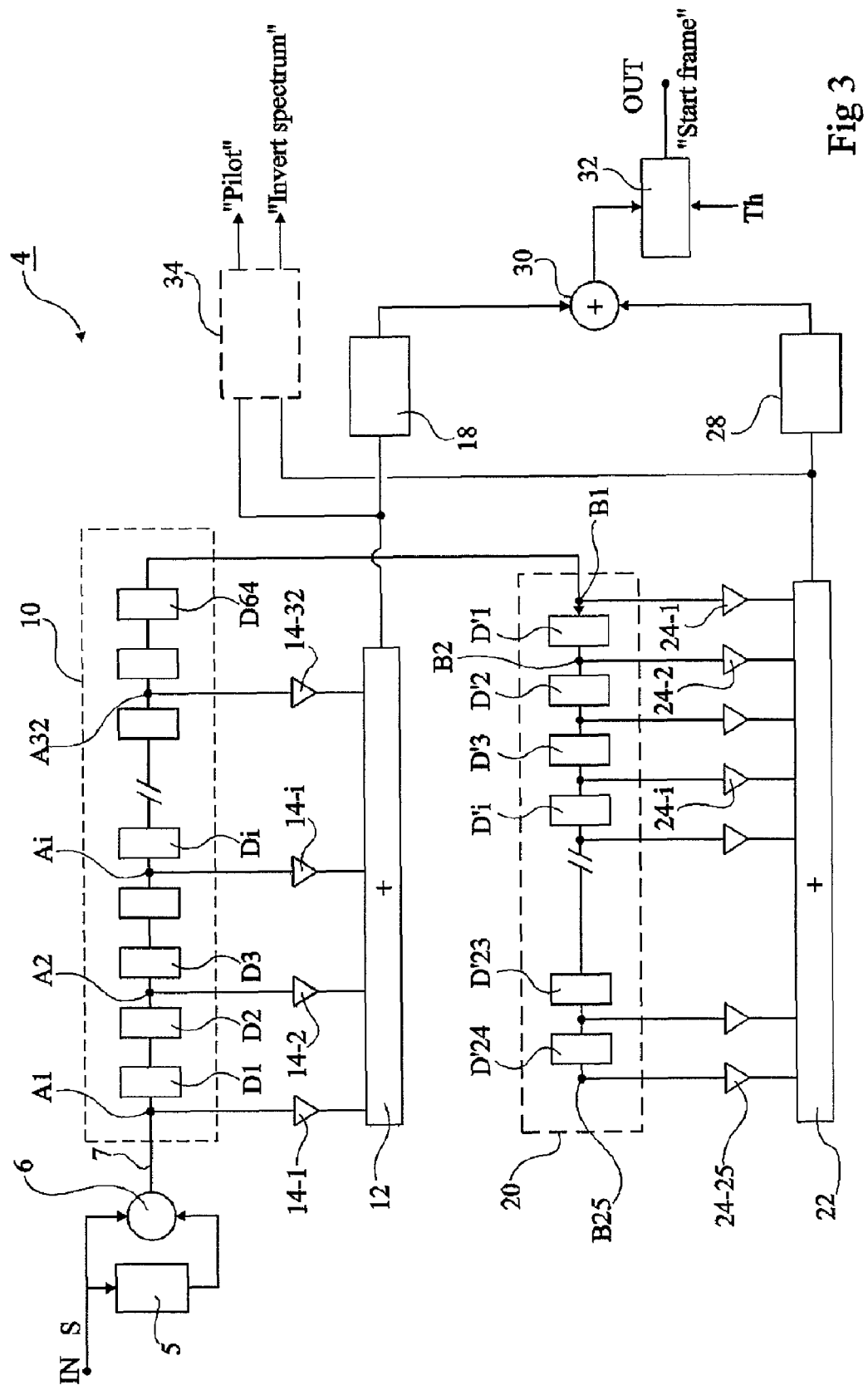
FIG. 3 shows a header acquisition diagram.

FIG. 3 shows a diagram of a circuit 4 for acquiring a header according to standard DVBS2, that is, with N1=26 (SOF portion) and N2=64 (PLS portion). Circuit 4 receives on an input IN a demodulated signal S formed of symbols or samples $S_n$ comprising a component in phase and a component in quadrature and that can be represented by a complex number. Signal S is led to a delay element 5 which causes a delay of one symbol and to a calculation element 6. Calculation element 6 calculates the multiplication of a current symbol $S_n$ by the conjugate of the preceding symbol $S^*_{n-1}$ and provides on a line 7 the real part of the result of the multiplication. Line 7 drives a delay line 10 comprising 64 delay elements D1 to D64 and 32 taps A1 to A32. Delay elements D1 to D64 are series-connected and each cause a delay equal to the duration of a symbol. Tap A1 is located at the input of first delay element D1 and there is one tap every two symbols.

Each of taps Ai is connected to a 32-input adder 12 via a gain unit 14-1 to 14-32. Each gain unit 14-$i$ may be programmed to value +1 or to value −1.

Delay line 10 drives a delay line 20. Delay line 20 comprises 24 delay elements D'1 to D'24 and 25 taps B1 to B25. Delay elements D'1 to D'24 are series-connected and each cause a delay equal to the duration of a symbol. Tap B1 is located at the input of first delay element D'1 and there is one tap after each delay element D'i. Each of taps Bi is connected to a 25-input adder 22 via a gain unit 24-1 to 24-25. Each gain unit 24-$i$ may be programmed to value +1 or to value −1.

Adder 12 is connected to a unit 18 which provides the absolute value of the result provided by adder 12. Adder 22 is connected to a unit 28 which provides the absolute value of the result provided by adder 22. Units 18 and 28 are connected to an adder 30 which adds the results provided by units 18 and 28. Adder 30 is connected to a comparator unit 32 which compares the result provided by adder 30 to a threshold Th and provides a signal "Start frame" on an output OUT if threshold Th is exceeded.

Optionally, a unit 34, in dotted lines in FIG. 3, is connected to the outputs of adders 12 and 22 to provide signals "Pilot" and "Invert spectrum", used to respectively indicate the presence or not of pilots and whether the spectrum has been inverted. This aspect will not be described in detail. Reference can be made for more details to European patent application N °6368011.0 of the applicant and of the same inventor, not published yet, incorporated herein by reference, filed on Jul. 1, 2005, entitled "Procédé de correction automatique de l'inversion spectrale dans un démodulateur et dispositif pour mettre en oeuvre le procédé".

The operation of circuit 4 is the following.

At a given time, each of the 25 taps 24-$i$ provides a signal equal to the real part of product $(S_n.S^*_{n-1})$. A received symbol $S_n$ is equal to the transmitted signal an multiplied by $e^{j\phi}n$, $\phi_n$ being a phase error especially due to the carrier frequency shift. $S_n.S^*_{n-1}$ is equal to product $a_n.a^*_{n-1}e^{j(\phi_n-\phi_{n-1})}$. In the general case where $a_n=A.e^{j\theta}n$ or $a_n=A.e^{j(\theta_n+\pi)}$, product $a_n.a^*_{n-1}$ is equal to 1 if $a_n=a_{n-1}$ and to −1 if an is opposite to $a_{n-1}$. Gain units 24-$i$ are brought to 1 or to −1 according to whether to successive elements of the known sequence of portion SOF are equal or not. Adder 22 thus provides a result which will be maximum (in absolute value, adder 22 providing a negative result in case of a spectrum inversion) in case of a perfect correlation between the 26 samples concerned by delay line 20 and the 26 samples of portion SOF. It should be noted that the fact of gathering the samples two by two (by forming overlapping pairs where each sample successively belongs to two successive pairs) enables limiting the effect of the frequency shift. Indeed, a correlation that can be called "differential" is achieved, where the phase difference between two successive "differential" elements (for example, $S_n.S^*_{n-1}$ and $S_{n+1}.S^*_n$) is equal to the phase difference between two successive samples, this phase difference varying much slower than the actual phase.

To determine a fast and effective acquisition of the header, a so-called "differential" correlation using the samples of portion PLS is also used. As for the SOF portion, the successive samples are processed by groups of two. Here, however, the samples are gathered in separate pairs, a sample being only involved in one pair at a time. It should here be noted that matrix M is such that, if bit b0 is 0, each of the 32 bits Bi of odd rank is equal to its predecessor and, if bit b0 is 1, each of the 32 bits Bi of even rank is followed by its inverse.

In the performed correlation, in each pair, the product of a sample by the previous conjugate sample is correlated to the unit vector, that is, for n=13 to n=44, the sum of products $S_{2n+1}.S^*_{2n}$ is calculated. Limits n=13 and n=44 are selected so that the concerned samples correspond to samples $S_{26}$ to $S_{89}$, that is, to the 64 samples of portion PLS. The correlation with the unit vector is selected because the present inventor has noted that, when two successive symbols of portion PLS are equal, differential symbol $S_{2n+1}.S^*_{2n}$ is equal to 1 (or more generally to the square of amplitude A of a symbol) and, if two successive symbols of portion PLS are opposite, different symbol $S_{2n+1}.S^*_{2n}$ is equal to −1 (or more generally to minus the square of their amplitude A). Gain units 14-$i$ multiply by +1 or by −1 the 32 differential symbols of portion PLS according to the value of the "differential" corresponding bits of word UW (in practice, unit 14-$i$ performs a multiplication by +1 if the two concerned bits of word UW are equal, and a multiplication by −1 otherwise.

Units 18 and 28 enable avoiding a negative result (calculation unit 18 receives a correlation of negative sign if the pilot bit is 1 and if there is no spectrum inversion, and calculation unit 28, which could be suppressed if the signal never exhibits a spectrum inversion, receives a negative correlation in case of a spectrum inversion). The detection of a header is provided when threshold Th is exceeded.

Thus, for any new incoming symbol, circuit 4 examines whether the 90 samples last received can form an eligible candidate for a frame header. If such is the case, a "start frame" signal is transmitted. There remains to validate this result.

Figure 4:
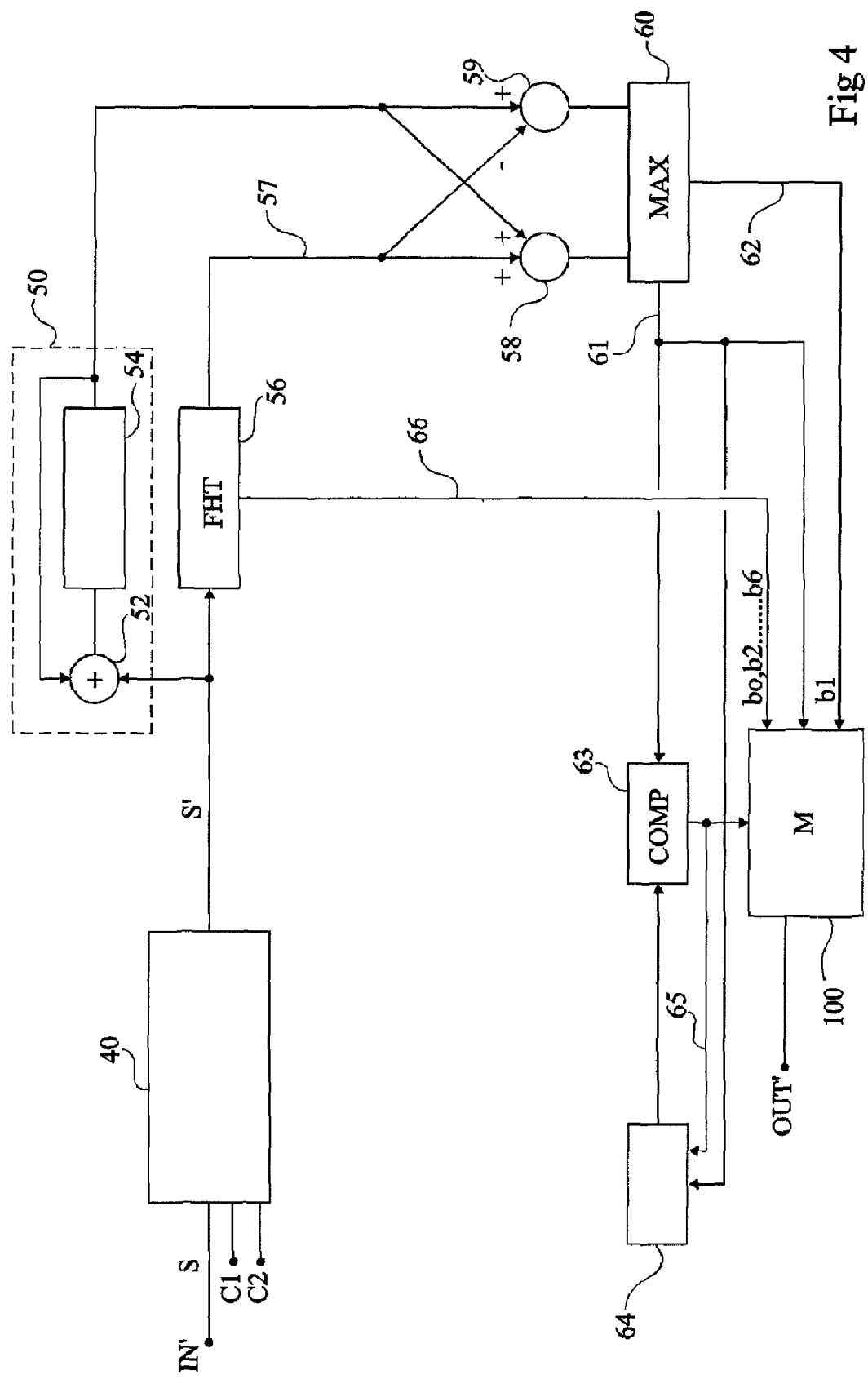
FIGS. 4 and 5 show circuits to validate and decode a header.
Figure 5:
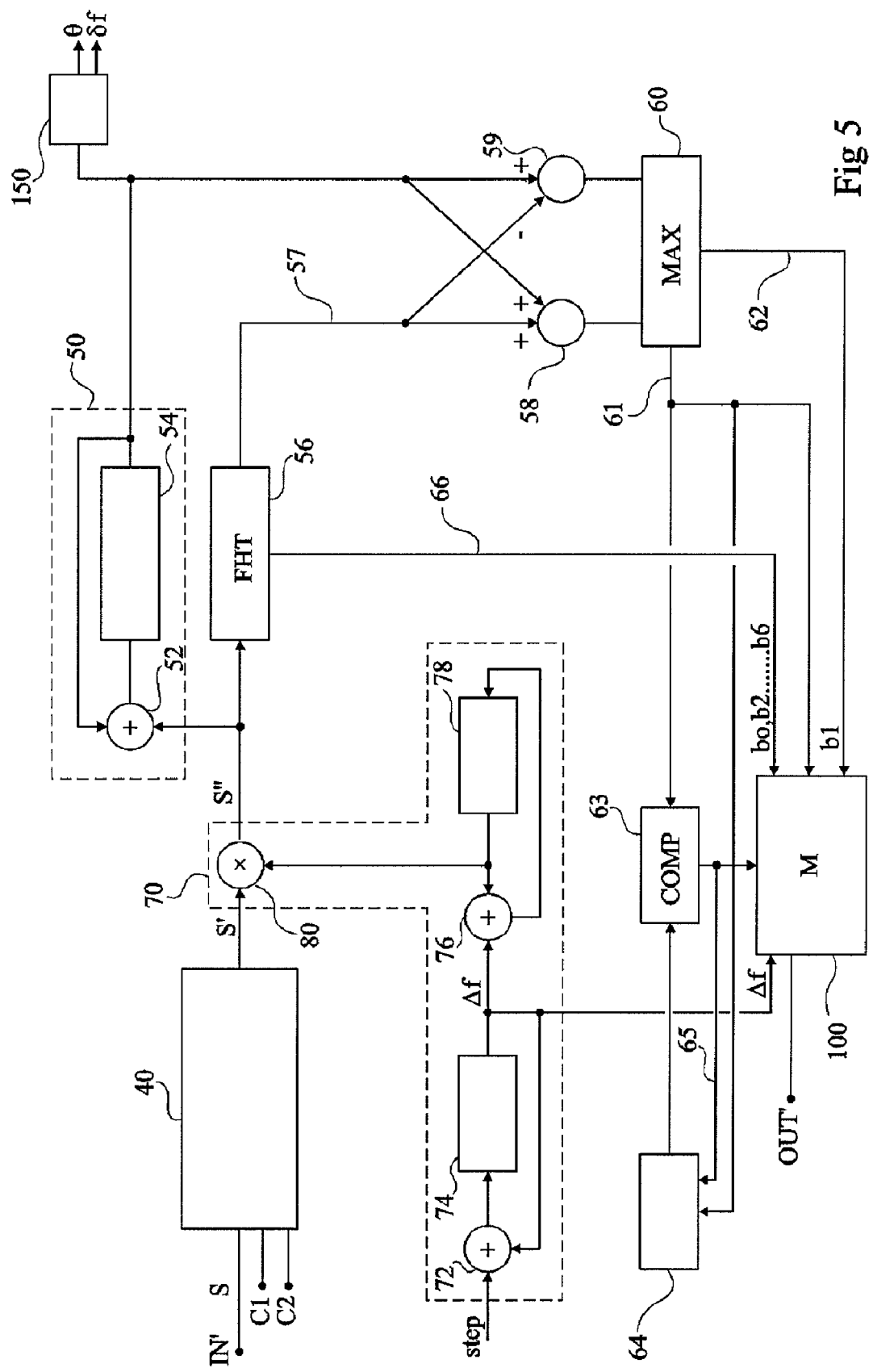

FIGS. 4 and 5 show validation and decoding circuits capable of stating whether the result provided by circuit 4 is correct or not. For simplicity, FIG. 4, which shows a simplified circuit with respect to that of FIG. 5 and in which the frequency shift is assumed to be zero, will first be described.

In FIG. 4, an input IN' receives the symbols as they are received, at the same time as they are provided to input IN of circuit 4. Inputs IN and IN' may further be one and the same input. The symbols received on input IN' are provided to a storage and processing unit 40. Unit 40 receives the samples as they are arriving and stores the 90 most recently arrived samples. Unit 40 comprises two control inputs C1 and C2.

Control input C1 is connected to output OUT of circuit 4. When circuit 4 transmits a "start frame" signal, said signal is provided to unit 40 which stores the 90 samples capable of forming a valid header. Further, in unit 40, the 90 stored symbols S are modified to provide samples S' so that the symbols S' provided by unit 40 are, in the case of an ideal signal, all equal to $e^{j\theta}$ for portion SOF (to within a frequency interval $\Delta f$) and to +or −$e^{j\theta}$ for portion PLS (it is assumed that the part of demodulation π/2.BSPK comprising rotating by π/2 all the odd symbols, in the reverse direction of what has been performed in the demodulator, has taken place). To obtain symbols S' of portion SOF, symbols S of portion SOF are multiplied by +1 or by −1 according to the known value of the bits of the known sequence used for portion SOF. To obtain symbols S' of portion PLS, symbols S of portion PLS are multiplied by +1 or −1 according to the known value of the bits of word UW. The multiplications by +1 or −1 of portions SOF and PLS are coherent so that the 90 samples S' provided by unit 40 are equal or opposite (to within the phase, frequency, and noise errors).

Symbols S' are provided to a unit 50 for correlating the 26 symbols of portion SOF. It is in this case an absolute correlation, and no longer a differential correlation as in FIG. 3. In FIG. 4, unit 50 is an accumulator which comprises an adder 52 and a register 54. Adder 52 receives the current symbol S' as well as the output of register 54. Register 54, initially set to zero, receives the output of adder 52 and provides a result equal to the sum of symbols S' having transited therethrough.

After the 26 symbols of the SOF have been processed, the output signal of unit 50 represents the correlation of the 26 symbols of the supposed header with the known symbols of portion SOF, due to the transformation of symbols S into symbols S' in unit 40.

Symbols S' are also provided to a unit 56, noted FHT, which uses the fast Hadamard transform and performs the correlation of the 64 symbols of portion PLS to obtain the 128 possible correlations for the 128 possible code words. The present inventor has further simplified the calculation of the correlations by noting that, according to the value of bit b1 of the code word, the sign of the correlation was changed and that, according to the value of bit b0 of the code word, the symbols of portion PLS were equal or opposite two by two. Thus, in the implementation shown in FIG. 4, unit 56 successively provides twice 32 correlation results.

Indeed, assuming that b0=0, the symbols are equal two by two and it can be operated on pairs of symbols, by adding the symbols two by two. There then remains to perform 64 correlations by means of 32 elements corresponding to bits b1 to b6 of the code word. Since, further, the sign of the correlation is inverted if b1=0, 32 correlations only are performed and their sign is inverted to find the correlations corresponding to the other value of b1. Thus, unit 56 provides twice 32 correlations which are transmitted, for example, sequentially, over a line 57. Unit 56 provides bits b0, b2, b3, b4, b5, and b6 of the code word associated with the correlation provided on line 57 over a line 66.

Line 57 is connected to two adders 58 and 59, also connected to unit 50. Adder 58 adds the correlation results provided by units 50 and 56. Adder 59 calculates the difference between the correlation provided by unit 50 and that provided by unit 56. Adders 58 and 59 are connected to a unit 60 noted "MAX". Unit 60 examines the modules of the results provided by adders 58 and 59, which are complex numbers, and provides the greatest module, designated hereafter as the correlation maximum or more simply the maximum, over a line 61. Further, unit 60 determines the value of bit b1 (the result of greatest module is provided by the output of adder 58 if bit b1 is equal to 0 and by the output of adder 59 if bit b1 is equal to 1). The value of bit b1 is provided by unit 60 over a line 62.

Via line 61, unit 60 is connected to a comparison unit 63 noted "COMP" and to a storage unit 64. Unit 64 stores the highest maximum which has been previously provided by unit 60. The value stored in unit 64 is compared in unit 63 to the current maximum provided by unit 60. If the value stored in unit 64 is greater than the maximum provided by unit 60, the value stored in unit 64 remains unchanged and unit 56 provides another correlation for another code word. If the value stored in unit 64 is smaller than the maximum provided by unit 60, comparator 63 provides over a line 65 an order to unit 64 to store the maximum provided by unit 60. The order conveyed by line 65 also controls a unit 100 noted M which stores the value of the correlation maximum provided by unit 60, jointly with the corresponding code word, by unit 56 over line 66 for bits b0, b2, b3, b4, b5, and b6, and by unit 60 for bit b1.

When the 32 correlations provided by unit 56 for bit b0=0 have been tested, unit 56 performs a new calculation of 32 correlations corresponding to bit b0=1. Similarly, the correlation maximum values are stored in unit 100 and, when the 128 correlation cases have been examined, unit 100 encloses the maximum value of the correlation, associated with the code word which has generated it.

FIG. 5 will now be described, where same reference numerals represent same elements as in FIG. 4. Units 40, 50, 56, 60, 63, 64, and 100, as well as adders 58 and 59, can thus be recognized in FIG. 5.

In FIG. 5, the validation and decoding circuit takes into account the phase shifts between samples. For this purpose, unit 70 is inserted between unit 40 and correlation units 50 and 56.

In FIG. 5, unit 70 comprises an adder 72, a register 74, an adder 76, a register 78, and a multiplier unit 80.

Adder 72 has two inputs. An input of adder 72 receives a "step" value which sets an incrementation step for the frequency shifts. The other input of adder 72 is connected to the output of register 74. Register 74 provides a frequency shift value $\Delta f$, which corresponds to a phase increment between two consecutive symbols. Register 74 maintains value $\Delta f$ constant for the entire series of tests bearing on the 128 correlations corresponding to the different possible code words and to the frequency shift value. At the beginning of the process, the value of the frequency shift is, for example, selected to be equal to zero. When the 128 correlations have been examined, the value of the frequency shift switches to the "step" value and the 128 correlations corresponding to this frequency shift value are examined. The frequency shift then switches to value 2."step", and so on until the maximum which is desired to be tested for the frequency shift.

Value $\Delta f$ is provided to an input of adder 76, which receives on its other input the output of register 78, that can be initially charged to zero, although this is not compulsory. The output of adder 76 drives the input of register 78. The output of register 78 is also connected to multiplier unit 80. The assembly formed by adder 76 and register 78 operates as an accumulator which stores, for each symbol, values 0, $\Delta f$, $2\Delta f$, $3\Delta f$, and so on until $89\Delta f$. Register 78 thus provides a phase information $\phi$ which regularly increases by $\Delta f$ for each sample. Phase information $\phi$ is provided to multiplier unit 80, which multiplies symbol S' delivered by unit 40 by value $e^{j\phi}$. Thus, the correlations performed by units 50 and 56 bear on samples S" exhibiting with respect to one another a phase shift corresponding to $\Delta f$. When the correlation calculations for the 128 different code words have been performed for phase shift $\Delta f$, unit 100 stores, for phase shift $\Delta f$, the maximum obtained for the correlation as well as the corresponding code word.

Then, unit 70 provides another set of 90 symbols S" having undergone another phase shift with respect to one another and the 128 correlations are determined by means of these symbols. For each test, unit 100 stores the maximum obtained correlation value, the value of the code word, and the value of the phase shift which are associated. When all the desired phase shift tests have been performed, that which has provided the strongest correlation is selected. Unit 100 then encloses, for the strongest correlation, the value of the code word, the value of the frequency shift, and the value of the correlation maximum corresponding to these parameters.

The value of the correlation maximum is then examined to validate or not the header. For example, if the correlation maximum is greater than a threshold, it will be considered that the tested header is a correct header. Otherwise, it will be considered that the 90 tested symbols do not correspond to a header and another header candidate will be searched for by means of the circuit of FIG. 3.

It should be noted that the general duration of the processing is shorter than the duration of a frame. Thus, when the header is validated, the frequency shift and the code word are known. The demodulation circuits can then adjust their frequency from as soon as the next frame and, the code word being decoded, the place of the next header is known.

For the processing of the next frame, the state is steady and it is not necessary to use the circuit of FIG. 3 to search for a header candidate. The circuit of FIG. 3 may be deactivated, or the header candidates that it could determine may not be taken into account. For example, control input C1 may be made inactive. Unit 40 may for example be controlled by a control input C2, shown in FIG. 5, control input C2 being activated to enable storage of the 90 symbols of the header of the frame to be decoded by unit 40.

In steady state, unit 70 may also be deactivated since the carrier frequency shift is substantially known, only a thin adjustment of the frequency shift having to be performed, as described hereafter. It should here be noted that the elements of unit 70 are generally present in controls or phase-lock loops used on demodulations enabling extracting the symbols and it is useless to duplicate unit 70 by physically implementing its elements in the circuit of FIG. 5. It is indeed sufficient to provide the use of these otherwise existing-elements on first acquisition of a header.

In steady state, unit 40 stores the 90 symbols of the header of the frame to be analyzed for the correlation calculations bearing on the 128 possible code words. At the end of the 128 correlations, the header is decoded as described previously and the code word is determined. In an embodiment, the code word is provided over a line not shown in unit 40. Unit 40, in a function which has not been described yet, uses the code word to transform the 64 symbols of portion PLS so that the symbols originating from unit 40 are all substantially equal in terms of absence of noise. There only remains between them a residual phase difference, which will be evaluated in a unit 150 as described hereafter. Indeed, when they are modified to all be substantially equal, symbols S' are in the form: $S'''_n = A.e^{j(\Theta+n\delta f)}$, $\delta f$ being a residual frequency error that must be known to efficiently decode the data symbols. In an embodiment, a determined number of symbols $S'''_n$ of the header is passed into correlator 50 to calculate their sum. In a practical example, the 90 symbols S''' are added, the phase of the obtained sum corresponding to that of the transmitter and enabling correctly demodulating the following symbols. Then, the first 30 header symbols are added, after which the last 30 are added. The results of the two additions are provided to a unit 150 which calculates the average phases of the first 30 and of the last 30 symbols of the header. By the difference of the previously-calculated average phases, unit 150 provides residual frequency error $\delta f$, used to control the demodulators on determination of the symbols. Such phase and frequency error data are very efficient since that have been obtained by smoothing over respectively 90 and 30 symbols.

Of course, the present invention is likely to have various alterations, modifications, and improvements which will readily occur to those skilled in the art. In particular, the various elements of FIGS. 3, 4, and 5 may be arranged differently. Only the functions of these elements are important and an element may for example be divided into several elements or, conversely, several elements may be gathered together.

Also, the functions may vary by a certain extent. For example, the circuit of FIG. 3 may operate on differential symbols, complex or not, on their real part, as described.

The circuits of FIGS. 4 and 5 may be very different, even when they still apply to terminal DVBS2. For example, unit 40 may perform storage only. The transformation into samples S' may not occur, the correlation units of portions SOF and PLS then being adapted. The correlations relating to portion PLS may be performed differently, adders 58 and 59 being then perhaps not necessary.

The method and the circuits according to embodiments of the present invention may find an application to satellite reception. For example, the circuits of FIGS. 3 to 5 may be present in decoders, demodulators, mobile or not receivers, computers, personal digital assistants (pdas), cellular phones, etc.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for determining a frame header formed of samples having been coded so that a sample exhibits either value $A.e^{j\Theta}$ or value $A.e^{j(\Theta+\pi)}$ and including at least N1 first samples corresponding to a first determined sequence and N2 second samples corresponding to a second sequence belonging to a set of N second determined sequences, the N2 second samples comprising either pairs of equal values or pairs of opposite values, comprising:
   a) a correlation step involving N1 samples, in which a correlation is performed between a product of a sample and of a conjugate of an adjacent sample and the corresponding values of the first sequence to generate a first result;
   b) a correlation step involving N2 samples, in which is performed a sum of the products of a sample of a pair of two successive samples by the conjugate of the other sample in the pair to generate a second result;
   c) a step of detection of a frame header based on the first and second results; and
   d) a step of validation of the detected frame header, wherein the step of validation comprises the step of:
   d1) correcting the first and second samples of the detected header for a determined frequency shift;
   d2) determining a correlation maximum bearing on the first and second corrected samples, during which step are performed, on the one hand, the correlation between each first corrected sample and the corresponding value of the first sequence and, on the other hand, the correlation between each second sample and the value that it would have in each of the second N determined sequences;
   d3) resuming, for a determined number of frequency shift values, the steps of correction d1) and of correlation d2) with another frequency shift value; and
   d4) validating the frame header based on the maximum correlation values determined at step d2).

2. The method of claim 1, wherein a frame header is detected if the sum of real parts of the correlations performed at steps a) and b) is greater than a first threshold.

3. The method of claim 1, wherein the detected frame header is validated if the greater one of the modules of the maximum correlation values determined at step f) is greater than a second threshold.

4. The method of claim 1, wherein the first and second samples originate from bits having undergone a modulation of $\pi/2.BPSK$ type.

5. A decoder or a demodulator implementing the method claim 1.

6. A receiver or a computer or a cellular phone implementing the method of claim 1.

7. A circuit for determining a frame header formed of samples having been coded so that a sample exhibits either value $A.e^{j\Theta}$ or value $A.e^{j(\Theta+\pi)}$ and including at least N1 first samples corresponding to a first determined sequence and N2 second samples corresponding to a second sequence belonging to a set of N second determined sequences, the N2 second samples comprising either pairs of equal values or pairs of opposite values, comprising:

a) a detection circuit for detecting a frame header, the circuit comprising:

a1) a first circuit dealing with N1 samples, for performing a correlation between a product of a sample and of a conjugate of an adjacent sample and the corresponding values of the first sequence;

a2) a second circuit dealing with N2 samples, for performing a sum of the products of a sample of a pair of two successive samples by the conjugate of the other sample of the pair;

a3) a first adder for adding the results originating from the first and second circuits; and a4) a detection unit for detecting a frame header when the real part of the result provided by the first adder is greater than a first threshold; and b) a validation and decoding circuit for validating and decoding the header detected by the detection circuit, the validation and decoding circuit comprising:

b1) a third circuit dealing with the N1 first samples of the detected header, for performing a correlation between each first sample and the corresponding value of the first sequence;

b2) a fourth circuit dealing with the N2 second samples of the detected header, for performing a correlation between each second sample and the value that it would have in a second specific sequence; and b3) a fifth circuit for determining the greatest of the modules of the sums of the correlations performed by the third and fourth circuits, N correlations being performed by the fourth circuit and a header being validated if the greatest of the modules is greater than a second threshold.

8. The circuit of claim 7, wherein the validation and decoding circuit further comprises a sixth circuit for providing the third and fourth circuits with corrected samples for a specific carrier frequency shift.

9. The circuit of claim 7, wherein the first circuit comprises N1-2 first delay elements, N1-1 first gain units coupled with the first delay elements, and a second adder coupled with the first gain units, and wherein the second circuit comprises N2 second delay elements, N2/2 second gain units coupled to the second delay elements, and a third adder coupled to the second gain units.

10. The circuit of claim 7, wherein parameter N1 is equal to 26, parameter N2 is equal to 64, parameter N is equal to 128, and wherein the fourth circuit uses a fast Hadamard transform and sequentially provides twice 32 correlations performed by means of N2/2 second samples, and wherein the fifth circuit comprises a fourth adder to calculate the difference between the correlation performed by the third circuit and the correlation performed by the fourth circuit, a fifth adder to calculate the difference between the correlation performed by the third circuit and the correlation performed by the fourth circuit, a unit for determining the module of the results delivered by the fourth and fifth adders and selecting the greatest one.

11. The circuit of claim 7, further comprising a seventh circuit capable of evaluating the average of the phases of the first and second samples of a valid header as well as the average of the phases of n1 samples of a valid header and the average of the phases of n2 samples of a valid header, to deduce therefrom the average phase of the samples and the variation of the average phase of the samples.

12. The circuit of claim 7, wherein the first and second samples originate from bits having undergone a modulation of $\pi/2$.BPSK type.

13. A receiver or a computer or a cellular phone comprising the circuit of claim 7.

14. A decoder or a demodulator comprising the circuit of claim 7.

15. A decoding circuit, comprising:

a first circuit that performs a correlation between first samples of a received header and a first sequence to produce a first correlation result;

a second circuit that performs a correlation between second samples of the received header and a second sequence to produce a second correlation result; and a third circuit that performs at least one of addition and subtraction on the first and second correlation results to produce a combined result.

16. The decoding circuit of claim 15, further comprising a fourth circuit that analyzes modules of the combined result.

17. The decoding circuit of claim 16, wherein the fourth circuit determines a greatest module of the combined result.

18. The decoding circuit of claim 15, further comprising a fourth circuit that corrects the first and second samples of the received header for a frequency shift.

19. The decoding circuit of claim 15, wherein the second circuit is configured to perform a fast Hadamard transform.

20. A method for decoding a frame header, the method comprising:

correlating first samples of a received header and a first sequence to produce a first correlation result;

correlating second samples of the received header and a second sequence to produce a second correlation result; and performing at least one of addition and subtraction on the first and second correlation results to produce a combined result.

21. The method of claim 20, further comprising analyzing modules of the combined result.

22. The method of claim 21, wherein analyzing further comprises determining a greatest module of the combined result.

23. The method of claim 20, further comprising correcting the first and second samples of the received header for a frequency shift.

24. The method of claim 20, wherein correlating the second samples of the received header and the second sequence comprises using a fast Hadamard transform.

25. A decoding circuit comprising:

a first circuit configured to perform a correlation between first samples of a received header and a first sequence to produce a first correlation result;

a second circuit configured to perform a correlation between second samples of the received header and a second sequence to produce a second correlation result; and a third circuit configured to correct the first and second samples of the received header for a frequency shift value.

26. The decoding circuit of claim 25, further comprising a fourth circuit configured to multiply third samples and fourth samples by the frequency shift value to produce the first and the second samples, respectively.

27. The decoding circuit of claim 25, further comprising a fifth circuit configured to:

perform at least one of addition and subtraction on the first and second correlation results to produce a combined result; and analyze modules of the combined result by determining a greatest module of the combined result.

28. The decoding circuit of claim 25, wherein the second circuit is configured to perform a fast Hadamard transform.

29. A method for decoding a frame header, the method comprising:
multiplying first samples of a received header by a first frequency shift value to produce first frequency-shifted samples;
multiplying second samples of a received header by the first frequency shift value to produce second frequency-shifted samples;
correlating first frequency-shifted samples and a first sequence to produce a first correlation result; and
correlating second frequency-shifted samples and a second sequence to produce a second correlation result.

30. The method of claim 29, further comprising:
multiplying the first samples by a second frequency shift value to produce third frequency-shifted samples;
multiplying the second samples by the second frequency shift value to produce fourth frequency-shifted samples;
correlating third frequency-shifted samples and the first sequence to produce a third correlation result; and
correlating fourth frequency-shifted samples and the second sequence to produce a fourth correlation result.

31. The method of claim 30, further comprising:
performing at least one of addition and subtraction on the first and second correlation results to produce a first combined result;
performing at least one of addition and subtraction on the third and fourth correlation results to produce a second combined result; and
determining if the first combined result is greater than or equal to the second combined result.

32. The method of claim 31, further comprising:
outputting the first frequency shift value and the first combined result if the first combined result is determined to be greater than or equal to the second combined result or outputting the second frequency shift and the second combined result if the first combined result is determined to be less than the second combined result.

33. The method of claim 29, wherein correlating the second samples of the received header and the second sequence comprises using a fast Hadamard transform.

* * * * *

UNITED STATES PATENT AND TRADEMARK OFFICE
CERTIFICATE OF CORRECTION

PATENT NO.        : 8,179,996 B2                                    Page 1 of 1
APPLICATION NO.   : 11/962805
DATED             : May 15, 2012
INVENTOR(S)       : Jacques Meyer It is certified that error appears in the above-identified patent and that said Letters Patent is hereby corrected as shown below:

In the Specification

In column 2, at line 57, replace "modules" with --moduli--.

In column 3, at each of lines 31 and 35, replace "modules" with --moduli--.

In column 3, at line 57, replace "module" with --modulus--.

In column 7, at line 36, replace "modules" with --moduli--.

In column 7, at each of lines 38 and 41, replace "module" with --modulus--.

In the Claims

In claim 3, column 10, at line 55, replace "modules" with --moduli--.

In claim 7, column 11, at line 32, replace "modules" with --moduli--.

In claim 7, column 11, at line 36, replace "modules" with --moduli--.

In claim 10, column 11, at line 59, replace "module" with --modulus--.

In claim 16, column 12, at line 19, replace "modules" with --moduli--.

In claim 17, column 12, at line 21, replace "module" with --modulus--.

In claim 21, column 12, at line 38, replace "modules" with --moduli--.

In claim 22, column 12, at line 40, replace "module" with --modulus--.

In claim 27, column 13, at line 1, replace "modules" with --moduli--.

In claim 27, column 13, at line 2, replace "module" with --modulus--.

Signed and Sealed this
Eleventh Day of February, 2014

Michelle K. Lee
*Deputy Director of the United States Patent and Trademark Office*